United States Patent [19]

Ikegami et al.

[11] 4,443,726

[45] Apr. 17, 1984

[54] BRUSHES AND METHOD FOR THE PRODUCTION THEREOF

[75] Inventors: Shigeru Ikegami; Takashi Ohsaki, both of Shizuoka, Japan

[73] Assignees: Toho Beslon Co., Ltd.; Japan Marine Machinery Development Assoc.; Sumitomo Heavy Industries, Ltd., all of Tokyo, Japan

[21] Appl. No.: 376,864

[22] Filed: May 10, 1982

[30] Foreign Application Priority Data

May 9, 1981 [JP] Japan ................................ 56-68911

[51] Int. Cl.[3] ........................................ H02K 13/00

[52] U.S. Cl. .................................. 310/248; 310/239; 310/253

[58] Field of Search ........................ 310/242, 248–253, 310/45, 239; 29/826; 428/366, 608, 614, 634; 313/354

[56] References Cited

U.S. PATENT DOCUMENTS

| | | | |
|---|---|---|---|
| 3,582,387 | 5/1968 | Marshall | 310/251 |
| 3,668,451 | 6/1972 | McNab | 310/248 |
| 3,821,024 | 6/1974 | Wilkin | 310/252 |
| 4,132,828 | 1/1979 | Nakamura | 428/366 |
| 4,140,832 | 2/1979 | Menegay | 310/248 |
| 4,267,476 | 5/1981 | Lee | 310/248 |
| 4,306,169 | 12/1981 | Diepers | 310/248 |
| 4,347,456 | 8/1982 | Chabrerie | 310/248 |
| 4,349,760 | 9/1982 | Diepers | 310/248 |

FOREIGN PATENT DOCUMENTS

| | | | |
|---|---|---|---|
| 1191234 | 5/1970 | United Kingdom | 310/248 |

*Primary Examiner*—R. Skudy

*Attorney, Agent, or Firm*—Sughrue, Mion, Zinn, Macpeak & Seas

[57] ABSTRACT

A brush, for use for example as an electrical pick-up, includes a brush portion composed of a bundle of metal coated carbon fibers arranged substantially in parallel. A base portion includes a region where the metal coated fibers have been bonded by diffusion via a hot pressing method, and at least one metallic piece bonded to the fiber bundle by diffusion by the same process. The brush of the invention has excellent durability and a conductivity.

25 Claims, 13 Drawing Figures

FIG. 1-a
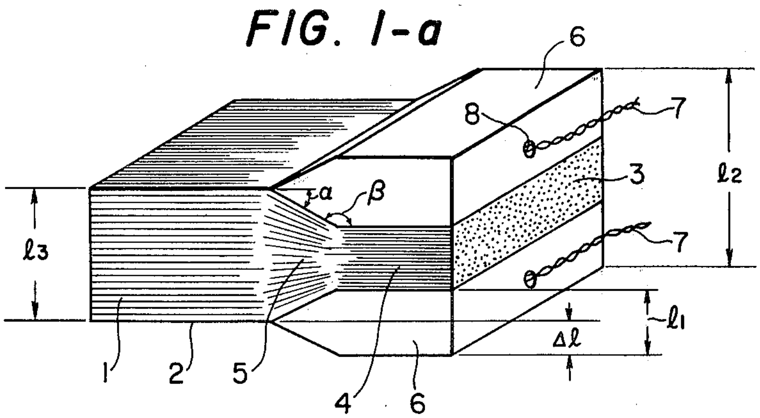
FIG. 1-b
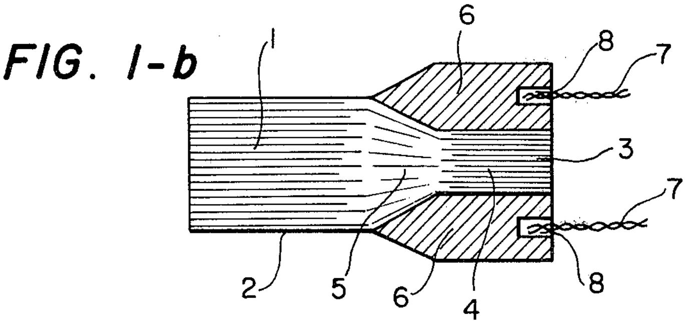
FIG. 2
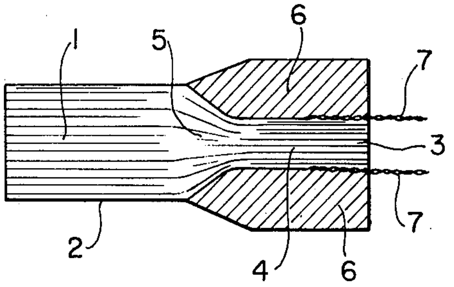
FIG. 3
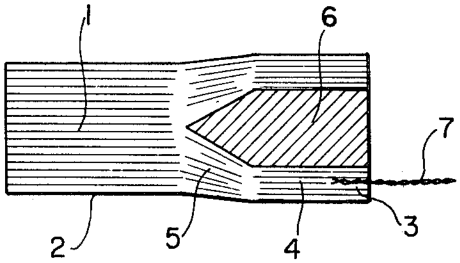

FIG. 4
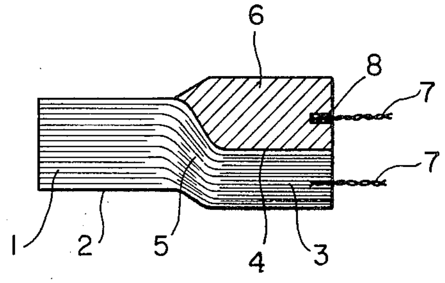
FIG. 5-a
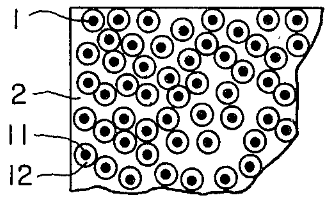
FIG. 5-b
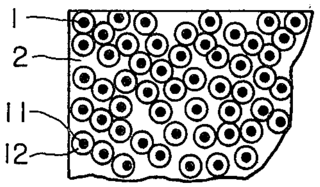
FIG. 5-c
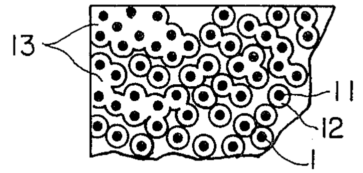
FIG. 5-d
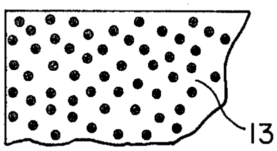
FIG. 6
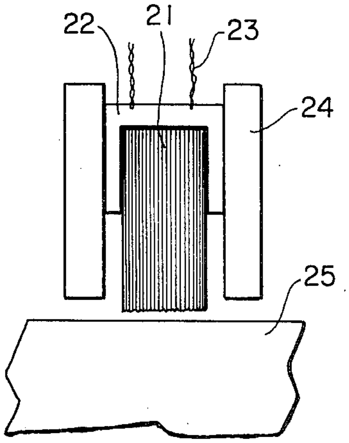
FIG. 7
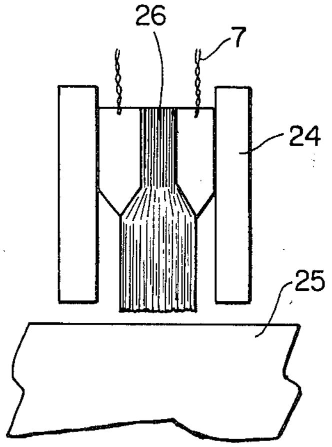

BRUSHES AND METHOD FOR THE PRODUCTION THEREOF

FIELD OF THE INVENTION

The present invention relates to high-performance brushes for use as electric conductors. More particularly, it is concerned with carbon fiber brushes which are increased in conductivity by coating with a metal, and a method for the production thereof.

BACKGROUND OF THE INVENTION

Graphite lumps or graphite-metallic powder mixed lumps have heretofore been used as brushes. These graphitic brushes, however, are brittle and furthermore, with recent advances in electric motors and so forth, materials which allow a large quantity of electricity to pass therethrough have been required. Under such circumstances, brushes using carbon fibers have been proposed.

Since carbon fibers are electrically conductive and flexible, brushes prepared using such carbon fibers are superior in their ability to conduct electricity and their sliding properties, etc., to conventional brushes made of graphite lumps. By coating carbon fibers with a metal, the ability to conduct electricity therethrough can be further increased. Such brushes are disclosed, for example, in U.S. Pat. No. 3,821,024.

To such brushes there can be provided the ability to conduct electricity by means of multi-point contact by utilizing a design such that one end of each carbon fiber is secured onto a cap (casing) while maintaining its electrical conductivity while the other end is provided in the split fiber state such that it is freely movable. In order to achieve such an arrangement of metal-coated carbon fibers, methods have been employed where one end of the fiber bundle is fixed by an adhesive, or is bound by means of metallic plates, etc., to form a base. These methods, however, give rise to problems, i.e., the ability to conduct electricity is reduced and the carbon fibers are prone to separate or break. Furthermore, the resistance at the joints where the base is connected to the cap and the cap is connected to a wire becomes a problem. Particularly, in connecting the base to the cap, it is necessary to employ techniques such as brazing and welding, because the oxidation of the carbon fibers and reactions between the carbon fibers and the metal should be prevented. In this case, however, severe control is required and mass production is difficult.

SUMMARY OF THE INVENTION

An object of the invention is to provide a brush having excellent durability and a high conductivity, and a method for producing such brushes.

Another object of the invention is to provide a brush of a structure which can be fabricated by a very simplified method.

The present invention, therefore, relates to:

a brush for conducting electricity which comprises a brush portion composed of a bundle of metal-coated carbon fibers disposed substantially in parallel, and a base wherein the bundle of metal-coated carbon fibers is joined together into one piece by a solid diffusion bonding (junction), the base having at least one electrically conductive metallic piece which is parallel to the bundle of carbon fibers and whose end is positioned at the end of the base; and, a process for producing a brush for conducting electricity, which comprises arranging metal-coated carbon fibers in parallel to form a bundle; while maintaining the fibers at the end portion of the bundle which is to form the brush portion in an independent state and arranged substantially in parallel, placing at least one metallic piece on the side of or inside the bundle in a manner such that the end of the metallic piece is positioned at the opposite side of the brush portion; and hot pressing to bond the metal-coated carbon fibers themselves, and the metal-coated carbon fibers and the metallic piece by solid diffusion bonding into a composite to form a base.

BRIEF DESCRIPTION OF THE DRAWINGS

FIG. 1-*a* is a perspective view of an example of a brush according to the invention;

FIG. 1-*b* is a cross-sectional view of the brush of FIG. 1-*a;*

FIGS. 2, 3 and 4 are cross-sectional views of other examples of brushes according to the invention;

FIGS. 5-*a,* 5-*b,* 5-*c* and 5-*d* are cross-sectional views taken at various positions along a brush of the invention;

FIG. 6 is a cross-sectional view of a conventional brush used to pick up or feed electricity;

FIG. 7 is a cross-sectional view of a brush of the invention in use, illustrating how the brush is used;

DETAILED DESCRIPTION OF THE PREFERRED EMBODIMENTS

Figure 8:
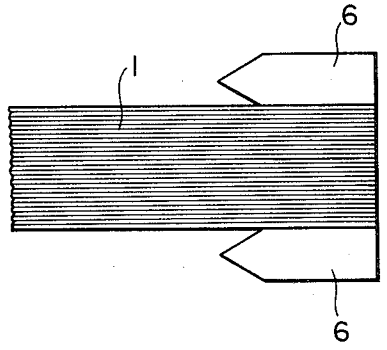
FIG. 8 is a cross-sectional view schematically illustrating the state in which metal-coated carbon fiber bundles and two metallic pieces are laminated prior to hot pressing in one step of producing a brush according to the invention; and, FIG. 9 is a cross-sectional view illustrating the hot pressing of the laminate of FIG. 8.

The term "solid diffusion bonding" as used herein indicates that two metallic solids have been directly bonded together through the mutual diffusion of atoms of the solids by means of hot pressing. This is also known in the art as solid diffusion welding or solid phase diffusion bonding.

The brush of the invention will hereinafter be explained with reference to the accompanying drawings.

Referring to FIG. 1-*a,* for example, illustrating a perspective view of a brush of the invention, the brush comprises metal-coated carbon fibers 1, a brush portion 2 comprising metal-coated carbon fiber bundles, a portion 3 where the carbon fibers are bonded together into a composite by a solid diffusion bonding, a base 4, an "intermediate region" 5 where the degree of solid diffusion bonding is gradually reduced from the base 4 to the brush portion 2 as described hereinafter, an electrically conductive metallic piece 6, and a leading wire 7.

Although the brushes illustrated in the drawings are rectangular in cross-section, they are not limited thereto and may be square, oval or circular. Usually, however, rectangular brushes are produced from the viewpoint of ease of use and fabrication.

Any carbon fibers can be used in the invention as long as, when coated with metal, they have such a mechanical strength such as to be capable of being used as brushes. Carbon fibers used in the present invention preferably have a tensile strength of more than about 10 $kg/mm^2$, a tensile modulus of elasticity of more than about 10,000 $kg/mm^2$ and a tensile elongation of more than about 0.1%, and more preferably more than about 100 $kg/mm^2$, 20,000 $kg/mm^2$ and 0.3%, respectively.

The carbon fibers are usually prepared from polyacrylonitrile, rayon, or pitch, and are known as high modulus carbon fibers, high strength carbon fibers, or low modulus carbon fibers. Mechanical properties of these fibers are shown in the following table. The thickness of carbon fiber used is usually from 5 to 10 μm from the viewpoint of the required strength and flexibility of the brush.

| | Tensile Strength (kg/mm²) | Tensile Modulus of Elasticity (kg/mm²) | Tensile Elongation (%) |
|---|---|---|---|
| High Strength Carbon Fiber | >300 | 20,000–30,000 | >1 |
| Low Modulus Carbon Fiber | >100 | >20,000 | >0.5 |
| High Modulus Carbon Fiber | >150 | >30,000 | >0.3 |

The metals which are used to coat or cover the carbon fibers are electrically conductive. Examples of metals which can be used in the invention include gold, silver, copper, aluminum, zinc, tin, magnesium, iron, nickel, cobalt, chromium, and their alloys. Of these metals, copper, aluminum, silver and alloys comprising at least two thereof are preferred in view of their good electrical conductivity.

The thickness of the coating layer is suitable from 0.1 to 4 μm. When the thickness is less than 0.1 μm, the ability to conduct electricity becomes insufficient, whereas when it is more than 4 μm, the metal is worn out during use and undesirably deposits on the surface of the drum of the electric motor. More preferably, the thickness of the coating layer is from 0.5 to 3 μm.

The coating with such metals can be performed by techniques such as electrical plating, chemical plating, chemical vapor-deposition, and ion plating. Ion plating is particularly preferred in that it permits uniform coating and, furthermore, the metal coating is firmly adhered to the carbon fibers. As described in U.S. Pat. No. 4,132,828, when ion plating is applied to carbon fiber bundles when they are appropriately spread, the fibers are coated uniformly with the metal and, furthermore, the thus-coated fibers are bonded to one another at suitable points, as a result of which there can be produced a metal-coated carbon fiber sheet having a network structure. The metal-coated carbon fibers as used herein may have such bonding points to the extent that the flexibility necessary for the brush is not lost. In this invention, carbon fibers having bonding points to such an extent are deemed to be "separated" or to be "in an independent state".

Fibers constituting the brush portion of fiber bundle are substantially independent, i.e., are separated. It is preferable to provide an "intermediate region" between the brush portion and the base portion, as shown in FIG. 1-*a*. In the "intermediate region" the total cross sectional areas of bonded portions is gradually reduced from the base to the brush portion (see FIGS. 5*b*–5*c*). The provision of such a region produces a buffer zone where the force acting on the fibers of the brush portion in a direction perpendicular to the lengthwise direction thereof is reduced and, therefore, the breakage of the fibers can be further reduced.

Metallic pieces which are applied to and are part of the base may be made of any of the metals that have been listed hereinbefore as coating metals. In particular, copper, aluminum, silver, and their alloys are preferred because of their good electrical conductivity.

The metal coating on the carbon fibers and the metallic piece constituting part of the base are not always required to be the same. However, the metallic piece should have a melting point higher than ½ of the absolute temperature of the melting point of the metal coated on the fiber. The reason for this will subsequently be made clear. Various combinations can be employed, including aluminum-coated carbon fiber/aluminum piece, aluminum-coated carbon fiber/copper piece, aluminum-magnesium alloy-coated carbon fiber/copper piece, copper-coated carbon fiber/copper-tin alloy piece, and silver-coated carbon fiber/copper piece.

The metallic piece is provided on the side of the base or the inside thereof. As can be seen from the drawings, the provision of the metallic piece increases the cross-sectional area of the base, thereby reducing the resistance of the brush and increasing the electrical conductivity thereof. The side of the base is the place where, when the brush is used, it is held in position by means of a holder. In order, therefore, for the holder to not come into contact with the brush portion, the thickness of the base is preferably designed so that the side of the base extends outwardly of the brush portion.

The metallic piece may take any form as long as it can achieve the objects of the invention. Plate-like metallic pieces having a sharp-pointed end as illustrated in FIGS. 1 to 4 are preferred so that the breakage of the metal-coated carbon fibers can be prevented when they are laminated and pressed, and so that the metal-coated carbon fibers can be easily joined together. The inclined portion from the prism portion to the sharp-pointed end may be either at an angle $\beta$ as shown in FIG. 1, or in circular arc form as shown in FIGS. 2 and 4. In particular, the use of a metallic piece wherein the portion containing the carbon fibers is formed as a circular arc reduces the breakage of the carbon fibers. In order to reduce the breakage of the fibers, it is preferred that the maximum angle of inclination of the carbon fibers, e.g., the angle $\alpha$ in FIG. 1-*a*, be set to 60° or less. More preferably it is set to 45° and less.

According to the invention, a brush may have the structure as shown in FIGS. 1 and 2 in which metal-coated carbon fibers are sandwiched between two metallic pieces; the structure as shown in FIG. 3 in which at least one metallic piece is inserted into the metal-coated carbon fiber bundles; or the structure as shown in FIG. 4 in which one metallic piece is mounted on one side of the metal-coated carbon fiber bundles, and so forth. In addition, a brush having a structure in which at least one metallic piece is provided on each side of and inside of the carbon fiber bundle may be used. For practicality and industrial productivity, one metallic piece as illustrated in FIGS. 3 and 4, or two metallic pieces as illustrated in FIGS. 1 and 2 are usually used. However, depending on the size of the brush, 20 or more metallic pieces may be used. In producing a large-sized brush, when the number of metallic pieces is small, the maximum angle of inclination of the carbon fibers increases, thereby causing the carbon fiber to be more easily damaged. Therefore, it is preferred that the number of metallic pieces be increased with the increase in the size of the brush.

The thickness, i.e., $l_2$ shown in FIG. 1-*a* of the base in the direction perpendicular to the side held by the holder is preferably greater than the thickness, i.e., $l_3$ of the brush portion in the same direction. This is controlled by selecting the thickness of the metallic piece $l_1$ so that the side held by the holder is positioned outwardly of the same side of the brush. In this manner, it is possible to prevent the holder from coming into contact with the carbon fiber of the brush portion. That is, in FIG. 1-*a*, it is sufficient for $\Delta l$ to be greater than zero.

An end of the wire is provided between the carbon fibers of the base, between the metallic piece and the fiber through a diffusion bonding, or to the end portion of the metallic piece at the side opposite the brush portion.

Although the above explanation has been made with respect to a plate-like metallic piece, i.e., a metallic piece having a rectangular cross-section, metallic pieces having various forms can be used in the invention, including pieces which are square in cross-section, one whose surface in contact with the holder is a circular arc, and so forth. Usually, however, a rectangular metallic piece is used for the same reasons as described for the cross-section of the brush.

Irrespective of the position at which the metallic piece is provided, i.e., either outside the base or inside the base, it is preferred to use a metallic piece having a size such as to extend over the surface to be held by the holder and the surface parallel thereto because controlling $\Delta l$ to be larger than zero and handling becomes easy, and the device can be more readily produced.

At a portion of the base where the metal-coated carbon fibers are bonded together into a composite, the packing ratio of the metal-coated carbon fibers, i.e., the ratio of the practical area occupied by the cross-section of the metal-coated carbon fiber to the apparent area occupied by the cross-section of metal-coated carbon fiber, is from 90 to 100% and preferably from 95 to 100% (in the case of 100%, there is no void). Similarly, at the brush portion, the packing ratio of the metal-coated carbon fiber is from 5 to 75% and preferably from 10 to 40%. When the packing ratio at the base is less than 90%, the bonding of the metal becomes insufficient, increasing the resistance. When the packing ratio at the brush portion is less than 5%, breakage of the brush resulting from the breakage of the carbon fibers easily occurs. When the packing ratio at the brush portion is more than 75%, the flexibility of the brush is reduced, and it becomes difficult to use. Cross-sections of the brush of FIG. 1 are shown at various positions in FIGS. 5*a*–5*d*. FIG. 5-*a* shows a cross-section of the brush portion. FIGS. 5-*b* and 5-*c* are cross-sections of the "intermediate regions" in the vicinity of the brush portion and in the vicinity of the base portion, respectively, and FIG. 5-*d* is a cross-section of the base portion. In the drawings, the reference numerals 11, 12 and 13 represent, respectively, carbon fibers, the metal covering the carbon fibers, and portions wherein the metal coated on the fiber is bonded together.

When the brush of the invention is used at a place where short-circuiting will occur even through limited scattering of fuzz (fluff), it is possible to prevent the scattering of cut fibers by providing a suitable resin on the brush portion. For this purpose, thermosetting resins such as an epoxy resin, a fluorine resin such as polytetrafluoroethylene and a phenol resin can be used. The resin can be applied to the brush portion by a conventional method, e.g., by the method disclosed in Japanese Patent Application (OPI) No. 115004/78 (the term "OPI" as used herein refers to a "published unexamined Japanese patent application"). These resins are used in such amounts that the brush portion does not lose the required flexibility. The amount of the resin used is usually about 10% by weight based on the weight of the metal-coated carbon fibers. The side of the base to be held by the holder is subjected to an insulation treatment by coating with insulating materials such as boron nitride and an ethylene tetrafluoride resin, as is the case with conventional brushes, for the purposes of preventing friction damage and as insulation. For example, boron nitride may be dispersed in an alcohol and applied for the insulation treatment, or boron nitride may be sprayed using hydrocarbon fluoride.

The brush of the invention in use will hereinafter be explained, in comparison with conventional brushes.

FIG. 6 shows a conventional brush which is used to pick up or feed electricity. Reference numeral 21 indicates a brush, 22 indicates a cap which is attached to hold the brush by means of a holder, 23 indicates a wire attached to the cap 22, 24 indicates the holder, and 25 indicates a rotor. In conventional brushes, such caps are provided after the production of the brush and connected by, for example, welding or a binder. FIG. 7 shows a brush of the invention in use, in which the reference numeral 26 indicates the brush having a wire 7 attached directly thereto. This brush is attached directly to the holder without the use of a cap.

The features of the brush of the invention are as follows:

In the brush of the invention, continuous carbon fibers are used to form both the base and the brush portions and are bonded together into a composite in the base and, therefore, no carbon fibers come out. Since the "intermediate region" is provided from the base to the brush portion as described hereinbefore, it is possible to prevent carbon fibers in the brush portion from breaking during the operation of the brush. Between the base and the brush portion, there is nothing which interferes with the flow of current; the metallic piece, which has good electrical conductivity, is disposed in such a state as to increase the cross-sectional area of the base; and the metal-coated carbon fibers themselves, and the metal-coated carbon fibers and the metallic piece are bonded by the diffusion bonding. Thus, the electrical resistance is low. Similarly, by bonding the base to the wire by a diffusion bonding, the resistance between the base and wire can be reduced. With conventional brushes, as illustrated in FIG. 6, a cap is attached to the base by the use of a binder so that the brush can be held by the holder, deteriorating the electrical conductivity therebetween. On the other hand, with the brush of the invention, it is not necessary to provide such caps and, therefore, the electrical conductivity is not deteriorated. That is, with the brush of the invention, the structure is simplified, the electrical conductivity is very high, and furthermore, since breakage is greatly reduced, the brush of the invention can be used stably over a long period of time. The brush of the invention can be produced by a very simple method as described hereinafter.

The brush of the invention is produced by arranging metal-coated carbon fibers in parallel to form a bundle; while maintaining the condition that the fibers at one end portion of the bundle, which is to form the brush portion, are in the independent (separated) state and are arranged in parallel. At least one metallic piece is placed on the side of or inside of the bundle in such a manner that the end of the metallic piece is positioned at the side opposite the brush portion. Hot pressing is then applied to bond the metal-coated carbon fibers themselves, and the metal-coated carbon fibers to the metallic piece by solid diffusion, to form a composite, to thereby form the base.

Figure 9:
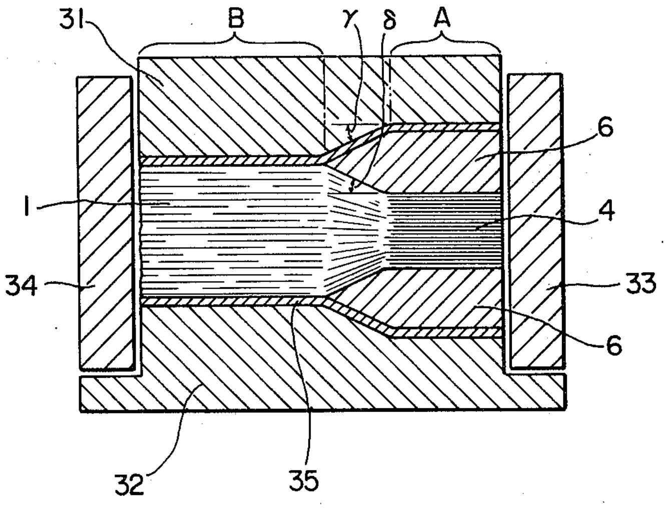

FIG. 8 is a cross-sectional view schematically illustrating the condition in which the fiber bundle and two metallic plates are laminated prior to the application of hot pressing. FIG. 9 is a cross-sectional view schematically illustrating the state wherein the laminate of FIG. 8 is hot-pressed.

The members indicated by the reference numerals 31 and 32 are pressing plates, which are designed to conform to the final shape of the brush. In this case, there are used pressing plates having a concave portion (A) and a convex portion (B). The portion (A) presses that portion where the metallic piece is placed to form the base of the brush, while portion (B) presses the portion which is to form the brush portion, or comes into contact with that portion. The reference numerals 33 and 34 are molds which are used to maintain the shape of both end portions of the brush and also to prevent the pressing plates 31 and 32 from deviating. Reference numeral 35 indicates a releasing agent such as graphite powder and boron nitride. When heated and pressed in this condition, at the portion (A), the metal of the metal-coated carbon fibers are bonded to each other by solid diffusion, and furthermore, a solid diffusion bonding of the metal of the metal-coated carbon fibers and the metallic piece is formed. At the portion (B), when heated and pressed, the fibers are maintained in parallel to each other without being bonded to each other. When this method of production is employed, an "intermediate region" is naturally formed between the base and the brush portion. By providing a sharp-pointed end to the metallic piece and changing the angle of inclination thereof, the extent of the variation from the solidified state to the separated state can be changed.

In order to obtain the solid diffusion bond, it is preferred that the hot-press temperature be lower than the melting point of the metal coated on the fiber, but higher than ½ of the absolute temperature of the melting point of this metal and, further, the temperature should be lower than the melting point of the metal or the alloy of the metallic piece. When the press temperature is higher than the melting point of the metal coated on the fiber, the metal melts and, therefore, the desired brush cannot be obtained. When the hot-press temperature is lower than the above-described lower limit temperature, the pressure-adhesion of the base portion to be bonded may be insufficient. When the hot-press temperature is the same or higher than the melting point of the metal or the alloy of the piece, the metallic piece is deformed by hot-pressing. The press pressure can be changed in combination with the press temperature. The pressure is usually from 1 to 2,000 $kg/cm^2$. When the press temperature is near the melting point of the metal coating, the press pressure is preferably about 1 $kg/cm^2$. As the press temperature is lower, the press pressure is required to be higher. However, when the press pressure exceeds 2,000 $kg/cm^2$, breakage of the carbon fibers easily occurs, which is not desirable. The hot pressing is applied in the direction perpendicular to the surface of the metallic piece disposed in parallel to the surface at which the brush is held by the holder. The hot pressing is applied under such conditions that when pressing is applied once, the metal-coated carbon fibers themselves and the metal-coated carbon fibers and the metallic piece are bonded together into a composite, at the same time, through diffusion.

The hot pressing may be performed in air, but it is preferred, to prevent oxidation of the metal coating, to use a vacuum, or an inert gas, e.g., argon, or a reducing gas atmosphere, e.g., hydrogen. To produce an improved bonding, it is preferred to perform the hot pressing in a vacuum.

When the hot pressing is applied as described above, there is obtained a brush as shown in FIG. 1-*a*. After pressing is completed, a hole 8 is bored in the metallic piece at the end thereof, and the wire is then applied by techniques such as welding, brazing or soldering. When applied between the fiber and the metallic piece, or between the fibers themselves as illustrated in FIG. 2 or 3, the wire is placed in such a manner prior to the hot pressing, and simultaneously with the hot pressing, the end of the wire is joined to the base. In this case, it is preferred that a hole is provided in the mold at the base end and at a point corresponding to the point where the wire is to be applied. Through the hole thus provided, the wire is provided between the carbon fibers, or between the carbon fibers and the metallic piece. When the wire is placed between the fiber and the metallic piece, it is preferred that a metallic piece provided with a groove be used, into which the wire is provided.

The thus-produced brush is, usually, subjected to a treatment to make the end of the brush portion even. The treatment is carried out, for example, by abrading the end of the brush portion to a sand paper supported on a rotating rotor.

In accordance with the method of the invention, there is produced a high performance brush using a greatly simplified procedure.

The invention will be described in further detail with reference to the following examples.

EXAMPLE 1

Tows comprising 12,000 carbon fibers (diameter: 7 μm, tensile strength: 300 $kg/mm^2$, tensile modulus of elasticity: 24,000 $kg/mm^2$, tensile elongation: 1.3%) were spread to a width of about 10 cm while arranging the carbon fibers parallel to each other. In this condition, the carbon fibers were placed in a vacuum vessel where pure aluminum was vaporized from a high frequency heating crucible in a $2\times10^{-7}$ Torr argon atmosphere and with a $-1.0$ kv fiber voltage. The metal was coated on the carbon fibers by ion plating to prepare aluminum-coated carbon fibers having an aluminum coating layer of a thickness of 1.5μ. Since the thus-prepared aluminum-coated carbon fibers had metal junctions therebetween, there was formed a sheet of aluminum-coated carbon fibers. In this way, 190 sheets having a length (in the direction of the fibers) of 50 mm and a width of 30 mm were prepared.

These sheets were placed in a mold which had been coated with a releasing agent (boron nitrode) as illustrated in FIG. 9 in the following sequence. The mold used herein had a length (in the direction of the fibers in the drawings) of 50 mm and a width of 30 mm. The length of the concave portion (A) was 26 mm, the length of the convex portion (B) was 15 mm, the angle of inclination from (A) to (B) was 30° (γ in FIG. 9), and the difference in the spacings between the concave portions and that of the convex portions of the pressing plate, i.e., 2 Δl in FIG. 1-*a*, was 10 mm.

Initially, a pure aluminum (99.9%) plate having a width of 30 mm, a thickness of 7 mm, and a length of 35 mm was trimmed to conform to the mold; i.e., the outside, which was to form the outside of the brush, was cut away from a point 26 mm from the end in the lengthwise direction at an angle of 30°, and the inside, which was to form the inside of the brush, was similarly cut away from a point at 31 mm at an angle of 30° (δ in FIG. 9), to produce a metallic piece having a sharp-pointed end as shown in FIG. 1-*a*, which was then placed in the mold. Then, one-half of the above-prepared aluminum-coated carbon fiber sheets were placed in the mold while keeping the carbon fibers at the brush portion arranged in parallel to each other. Thereafter, two wires of high purity aluminum (99.999%) having a diameter of 4 mm and a length of 100 mm were inserted through holes bored in the mold 33 in such a manner that a 10 mm portion of the wire was overlaid on the aluminum-coated carbon fiber sheet with a distance of 8 mm from the center of the sheets. In the same manner as above, the remainder of the aluminum-coated carbon fiber sheets were then introduced into the mold, and furthermore, a pure aluminum plate having the same size and shape as the pure aluminum plate first introduced as described above was introduced into the mold.

The mold was then placed in a vacuum hot press apparatus, and hot pressing was performed at 480° C. and with a pressure of 700 kg/cm$^2$ for 15 minutes. There was thus prepared a brush with two lead wires in which the width was 30 mm, the length was 50 mm, the thickness of the brush portion was 5.4 mm (packing ratio: 28%), the thickness of the base was 15.4 mm, the thickness of the portion where the aluminum-coated carbon fibers were bonded together into a composite was 1.5 mm (packing ratio: 99%), and the total thickness of the aluminum plate was 13.9 mm. This brush, comprising carbon fibers and aluminum, had excellent electrical conductivity.

EXAMPLE 2

The same carbon fiber tows as used in Example 1 were spread to a width of about 10 cm in the same manner as in Example 1, and an aluminum-magnesium alloy (magnesium content: about 3% by weight) was provided thereon to a thickness of 2 μm by ion plating to form a sheet-like fiber bundle. From the thus-formed sheet was cut out a sheet having a width of 30 mm and a length of 50 mm. In this way, 500 sheets were prepared.

Initially, 250 sheets were placed in the same mold used in Example 1. Subsequently, a pure copper plate having a width of 30 mm, a thickness of 18.3 mm, and a length of 36 mm, in which the angle of the top end was initially 90° and was cut away so that the angles of inclination of both the top and bottom surfaces of the metallic piece were the same, was placed in the mold so as to fonform the mold. Thereafter, the remaining 250 sheets were incorporated into the mold.

The mold was then vacuum-hot pressed for about 30 minutes at 460° C. and at a pressure of 1,000 kg/cm$^2$. There was thus produced a brush as illustrated in FIG. 3, in which the width was 30 mm, the length was 50 mm, the thickness of the brush portion was 12.6 mm (packing ratio: 34%), the thickness of the base was 22.6 mm, and the thickness of the portion where the aluminum-magnesium coated carbon fibers were bonded together into a composite was 4.3 mm (packing ratio: 100%). To the copper plate of the brush base was soldered a wire having a diameter of 5 mm and a length of 150 mm which had been prepared by twisting fine copper wires.

The thus-produced brush was subjected to an insulation treatment using boron nitride on the side thereof, and was mounted on an electric motor and operated. As a result, it was found that its ability to conduct electricity was about 2.5 times that of conventional graphite brushes having the same cross-sectional area, and furthermore, its sliding properties were good.

EXAMPLE 3

The same carbon fiber tows as used in Example 1 were spread to a width of about 10 cm in the same manner as in Example 1, and copper was provided thereon to a thickness of 1 μm by ion plating. From the thus-formed sheet was cut a sheet having a width of 25 mm and a length of 40 mm. In this way, 700 sheets were prepared.

These sheets were placed in a mold as shown in FIG. 9, which had been coated with a releasing agent (boron nitride), in the following sequence. The mold had a width of 25 mm and a length of 40 mm. The length of the concave portion was 25 mm, the length of the convex portion was 12 mm, and 2 Δl (as specified in Example 1) was 2 mm.

Initially, a 1.4 mm thick silver plate having a width of 25 mm and a length of 27 mm, and a top end designed so that the angles of inclination of both surfaces of the metallic piece were the same (30°) was placed in the mold. Then, 175 sheets were introduced thereinto. Thereafter, a silver plate having the same shape as described above was introduced, 175 sheets were laminated thereon in combination with copper wires, and a silver plate was further introduced thereinto. In this manner, five silver plated and four layers of sheets were laminated alternatively on one other, and into the carbon fibers of the second and fourth sheet layers, two copper wires were fitted.

This mold was vacuum-hot pressed at 650° C. and with a pressure of 300 kg/cm$^2$ for 10 minutes, and there was thus produced a brush with copper lead wires, in which the base was comprised of silver, copper, and carbon fibers, and the brush portion was comprised of copper-coated carbon fibers. The thickness of the brush portion was 10 mm (packing ratio: about 50%), the thickness of the base was 12 mm, the total thickness of the silver plate was 7 mm, and the total thickness of the portion where copper-coated carbon fibers were bonded into a composite piece was 5 mm (packing ratio: 98%).

The thus-obtained brush was subjected to an abrading treatment using a sand paper supported on a rotating rotor to make the end of the brush portion even.

While the invention has been described in detail and with reference to specific embodiments thereof, it will be apparent to one skilled in the art that various changes and modifications can be made therein without departing from the spirit and scope thereof.

What is claimed is:

1. A brush for conducting electricity, comprising: a brush portion comprising a bundle of metal-coated carbon fibers disposed substantially in parallel with one another, and a base, said base including a region where said metal-coated carbon fibers are joined together into a composite by diffusion bonding, said base having at least one electrically conductive metallic piece arranged parallel to the bundle of carbon fibers and having one end positioned at an end of said base, wherein the metallic base is a plate-like member having a sharpened end at a side thereof proximate the brush portion.

2. The brush as claimed in claim 1, wherein said carbon fibers have a tensile strength of more than 10 $kg/mm^2$, a tensile modulus of elasticity of more than 10,000 $kg/mm^2$, and a tensile elongation of more than 0.1%.

3. The brush as claimed in claim 1, wherein the thickness of said carbon fibers is from 5 to 10 μm.

4. The brush as claimed in claim 1, wherein the metal coated on the carbon fibers is selected from the group including gold, silver, copper, aluminum, zinc, tin, magnesium, iron, nickel, cobalt, chromium, or an alloy comprising two or more thereof.

5. The brush as claimed in claim 1, wherein the thickness of the metal coating on the carbon fibers is from 0.1 μm to 4 μm.

6. The brush as claimed in claim 1, further comprising an intermediate region between said brush portion and said base region wherein the degree of solid diffusion bonding is gradually reduced from the base portion to the brush portion.

7. The brush as claimed in claim 1, wherein the metallic piece is made of a metal selected from the group including gold, silver, copper, aluminum, zinc, tin, magnesium, iron, nickel, cobalt, chromium or an alloy comprising two or more thereof.

8. The brush as claimed in claim 1, wherein the metallic piece is made of a metal or an alloy having a melting point of not less than ½ of the absolute temperature of the melting point of the metal coated on the carbon fiber.

9. The brush as claimed in claim 1, wherein the metallic piece of the base is provided on a side of said diffusion bonded region of said fibers.

10. The brush as claimed in claim 1, wherein the metallic piece of the base is provided intermediate sid diffusion bonded region of said fibers.

11. The brush as claimed in claim 1, wherein the thickness of the base is greater than the thickness of the brush portion.

12. The brush as claimed in claim 1, wherein the maximum angle of inclination of the carbon fibers is 60° or less.

13. The brush as claimed in claim 1, wherein at least one metallic piece is provided on a side of the metal-coated carbon fiber bundle.

14. The brush as claimed in claim 1, wherein at least one metallic piece is inserted in the fiber bundle.

15. The brush as claimed in claim 1, wherein at least one metallic piece is provided on each side of and inside of the fiber bundle.

16. The brush as claimed in claim 1, wherein one end of a lead wire is connected to the fibers of the base by a diffusion bonding.

17. The brush as claimed in claim 1, further including a lead wire connected between the metallic piece of the base and the fiber bundle by a diffusion bonding.

18. The brush as claimed in claim 1, wherein one end of a lead wire is provided on an end portion of the metallic piece at a side thereof opposite the brush portion.

19. The brush as claimed in claim 1, wherein the packing ratio of the metal-coated carbon fibers constituting the base is from 90 to 100%.

20. The brush as claimed in claim 1, wherein the packing ratio of the metal-coated carbon fibers in the brush portion is from 5 to 75%.

21. The brush as claimed in claim 1, wherein the metal coated on the carbon fiber is aluminum, and the metallic piece is aluminum.

22. The brush as claimed in claim 1, wherein the metal coated on the carbon fiber is an aluminum-magnesium alloy, and the metallic piece is copper.

23. The brush as claimed in claim 1, wherein the metal coated on the carbon fiber is copper, and the metallic piece is silver.

24. The brush as claimed in claim 1, wherein the metal coated carbon fibers are joined to one another at points to form a network structure.

25. The brush as claimed in claims 1, 6, 7, 8, 9, 10, 13, 14, 15, 16, 17 or 18, wherein said metallic piece is joined to said diffusion bonded region of said fibers of said base by a diffusion bonding.

* * * * *